US010108359B2

United States Patent
Simionescu et al.

(10) Patent No.: US 10,108,359 B2
(45) Date of Patent: Oct. 23, 2018

(54) METHOD AND SYSTEM FOR EFFICIENT CACHE BUFFERING IN A SYSTEM HAVING PARITY ARMS TO ENABLE HARDWARE ACCELERATION

(71) Applicant: Avago Technologies General IP (Singapore) Pte. Ltd., Singapore (SG)

(72) Inventors: Horia Simionescu, Foster City, CA (US); Timothy Hoglund, Colorado Springs, CO (US); Sridhar Rao Veerla, Bangalore (IN); Panthini Pandit, Bangalore (IN); Gowrisankar Radhakrishnan, Colorado Springs, CO (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 34 days.

(21) Appl. No.: 15/335,030

(22) Filed: Oct. 26, 2016

(65) Prior Publication Data

US 2018/0113633 A1 Apr. 26, 2018

Related U.S. Application Data

(60) Provisional application No. 62/410,752, filed on Oct. 20, 2016.

(51) Int. Cl.
*G06F 12/00* (2006.01)
*G06F 3/06* (2006.01)
*G06F 12/0871* (2016.01)

(52) U.S. Cl.
CPC ............ *G06F 3/0619* (2013.01); *G06F 3/065* (2013.01); *G06F 3/0659* (2013.01); *G06F 3/0689* (2013.01); *G06F 12/0871* (2013.01); *G06F 2212/604* (2013.01)

(58) Field of Classification Search
None
See application file for complete search history.

(56) References Cited

U.S. PATENT DOCUMENTS

| 5,931,920 | A | 8/1999 | Ghaffari et al. |
| 6,640,290 | B1 | 10/2003 | Forin et al. |
| 7,730,239 | B2 | 6/2010 | Chang et al. |
| 8,266,116 | B2 | 9/2012 | Agarwal et al. |
| 9,134,909 | B2* | 9/2015 | Padia ...................... G06F 3/061 |
| 9,280,609 | B2 | 3/2016 | Liu |
| 2004/0128463 | A1 | 7/2004 | Kim et al. |
| 2007/0156997 | A1* | 7/2007 | Boule ................... G06F 12/023 |
| | | | 711/170 |
| 2013/0326154 | A1 | 12/2013 | Haswell |

* cited by examiner

*Primary Examiner* — Midys Rojas
(74) *Attorney, Agent, or Firm* — Sheridan Ross P.C.

(57) ABSTRACT

A system and method for efficient cache buffering are provided. The disclosed method includes receiving a host command from a host, extracting command information from the host command, determining an Input/Output (I/O) action to be taken in connection with the host command, determining that the I/O action spans more than one strip, and based on the I/O action spanning more than one strip, allocating a cache frame anchor for a row on-demand along with a cache frame anchor for a strip to accommodate the I/O action.

20 Claims, 11 Drawing Sheets

METHOD AND SYSTEM FOR EFFICIENT CACHE BUFFERING IN A SYSTEM HAVING PARITY ARMS TO ENABLE HARDWARE ACCELERATION

CROSS-REFERENCE TO RELATED APPLICATIONS

This Non-Provisional Patent Application claims the benefit of U.S. Provisional Patent Application No. 62/410,752, filed Oct. 20, 2016, the entire disclosure of which is hereby incorporated herein by reference.

FIELD OF THE DISCLOSURE

The present disclosure is generally directed toward computer memory.

BACKGROUND

Traditional caching algorithms in large storage architectures (e.g., MegaRAID) inherently require region locks to avoid data inconsistency. The same buffers are often re-used for all read/writes for given strip/stripe. Hence it is required to make sure that no two Direct Memory Access (DMA) operations act on the same buffers. This effectively creates a need for serialization to make sure that no two Input/Output (I/O) commands act on the same buffer at the same time.

Unfortunately, existing caching algorithms have high latency. Another drawback to existing caching algorithms is that they are highly coupled and very difficult to decouple for purposes of achieving hardware automation.

Unlike RAID 0 and RAID 1, RAID 5 and RAID 6 would have one or two parity arms for redundancy. Having parity exposes its own challenges since each update for the data arms also results into an update for the parity. So the same algorithm that is used for RAID 0/1 would need modification as a parity update is involved.

To perform the above step there is a need for an optimized data structure to contain the information of all the data arms and parity arms. Moreover, when the caching is automated, there is a need to represent all the arms in a compact form so as to reduce the memory foot print.

BRIEF DESCRIPTION OF THE DRAWINGS

The present disclosure is described in conjunction with the appended figures, which are not necessarily drawn to scale.

DETAILED DESCRIPTION

Figure 1:
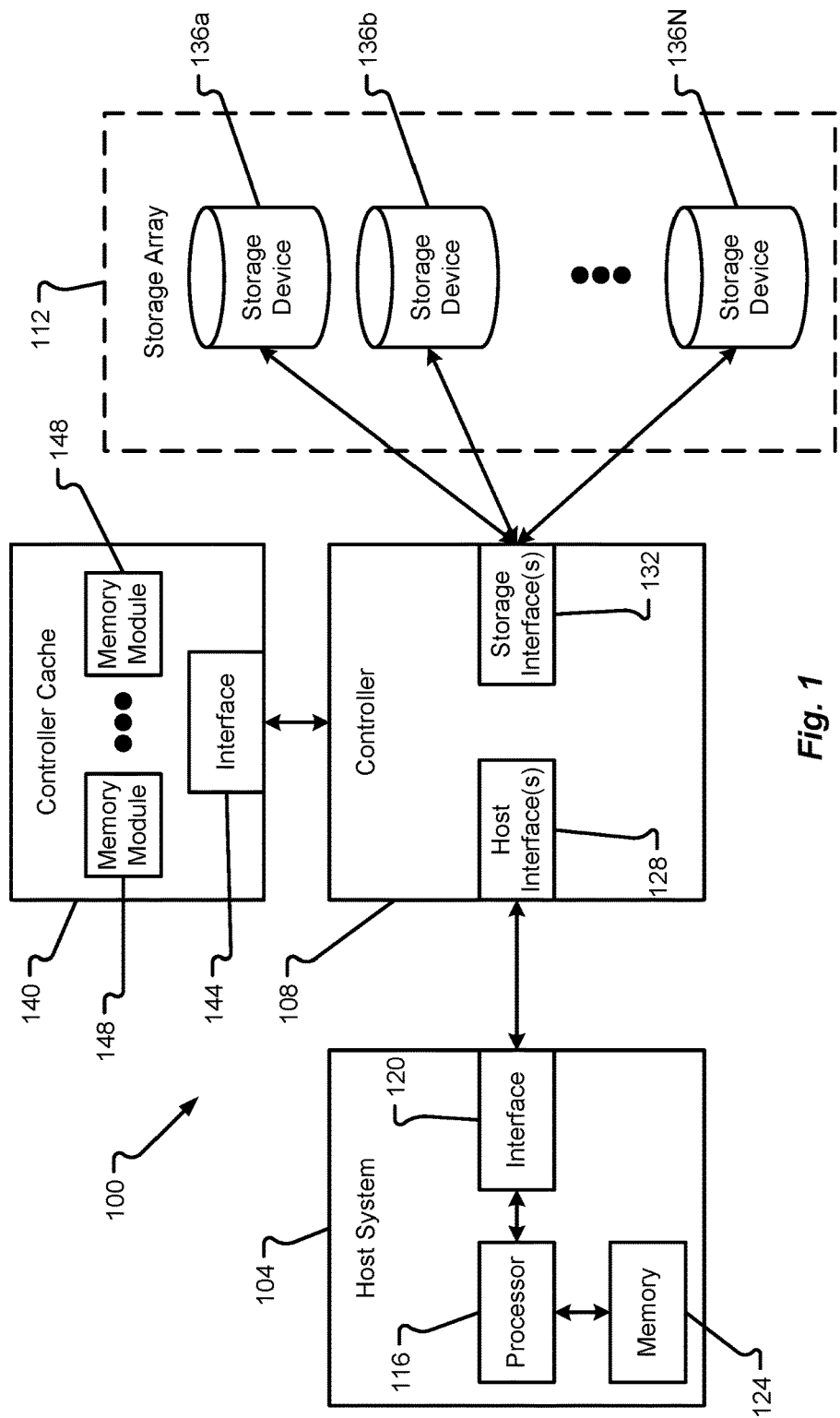
FIG. 1 is a block diagram depicting a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

As will be discussed in further detail herein, embodiments of the present disclosure present an optimized write buffering algorithm to avoid region lock processing for RAID 5/6 write back I/O processing without compromising the data integrity.

A space efficient and optimized row frame structure is also provided to represent all arms in a RAID 5/6 volume. A framework, in some embodiments, is designed such that a row is created only when the I/O spans more than one arm.

The row structure provisions a RowMod co-efficient (which indicates the location of the parity drive within a RAID 5/6 volume). This effectively helps in avoiding repeated division operations. In some embodiments, pointers are also provided in a cache segment or row structure to maintain a dirty list/tree.

Although embodiments of the present disclosure will be described in connection with managing a RAID architecture (e.g., a RAID-5 or RAID-6 type of architecture) having parity, it should be appreciated that embodiments of the present disclosure are not so limited. In particular, any controller that finds benefits associated with supporting variable stripe, strip, or row sizes can implement some or all of the functions and features described herein.

With reference to FIGS. 1-9, various embodiments of the present disclosure will be described. While many of the examples depicted and described herein will relate to a RAID architecture, it should be appreciated that embodiments of the present disclosure are not so limited. Indeed, aspects of the present disclosure can be used in any type of computing system and/or memory environment. In particular, embodiments of the present disclosure can be used in any type of caching scheme (whether employed by a RAID controller or some other type of device used in a communication system). In particular, hard drives, hard drive controllers (e.g., SCSI controllers, SAS controllers, or RAID controllers) may be configured to implement embodiments of the present disclosure. As another example, network cards or the like having cache memory may also be configured to implement embodiments of the present disclosure.

With reference now to FIG. 1, additional details of a computing system 100 capable of implementing hashing methods and various cache lookup techniques will be described in accordance with at least some embodiments of the present disclosure. The computing system 100 is shown to include a host system 104, a controller 108 (e.g., a SCSI controller, a SAS controller, a RAID controller, etc.), and a storage array 112 having a plurality of storage devices 136a-N therein. The system 100 may utilize any type of data storage architecture. The particular architecture depicted and described herein (e.g., a RAID architecture) should not be construed as limiting embodiments of the present disclosure. If implemented as a RAID architecture, however, it should be appreciated that any type of RAID scheme may be employed (e.g., RAID-0, RAID-1, RAID-2, ..., RAID-5, RAID-6, etc.).

In a RAID-0 (also referred to as a RAID level 0) scheme, data blocks are stored in order across one or more of the storage devices 136a-N without redundancy. This effectively means that none of the data blocks are copies of another data block and there is no parity block to recover from failure of a storage device 136. A RAID-1 (also referred to as a RAID level 1) scheme, on the other hand, uses one or more of the storage devices 136a-N to store a data block and an equal number of additional mirror devices for storing copies of a stored data block.

Higher level RAID schemes can further segment the data into bits, bytes, or blocks for storage across multiple storage devices 136a-N. One or more of the storage devices 136a-N may also be used to store error correction or parity information. RAID 5, for example, utilizes the combination of striping and parity techniques. In case of RAID 5, the flow of data is split into the blocks of a certain size (block size) which are then written onto the member storage devices 136a-N in turn. In each row, one of the devices is assigned to store a certain checksum, a so called parity function, which is calculated based on the data from other member disks in the row. In case of a single disk failure, the missing data can be calculated using the parity. In such a way fault tolerance is provided.

A minimum of three storage devices/disks is used for RAID 5. Theoretically, the maximum number of the storage devices/disks is not limited, but in practice, it is needed to take into account the controller capacity in case of a hardware RAID. The capacity of the array is (N−1) times the size of the smallest member storage device/disk for the array of N storage devices/disks. Thus, the capacity of one storage device/disk is used to store the parity function data to provide fault tolerance.

Read speed in RAID 5 is the similar to that of RAID 0 provided that the number of storage devices/disks is the same. However, due to the fact that it is useless to read the parity data, the read speed is just (N−1) times faster but not N times as in RAID 0.

RAID 6 uses both striping and parity techniques, but unlike RAID 5, the RAID 6 architecture utilizes two independent parity functions which are then written to two member storage devices/disks. Typically, one of these parity functions is the same as in RAID 5 (e.g., an XOR function), while the second is more complex. The parity data helps to recover data in case of simultaneous failure of two member disks.

A minimum of four storage devices/disks are used to create RAID 6. The capacity of the array is (N−2) times the size of the smallest member storage device/disk for the array of N storage devices/disks. Read speed is (N−2) times faster than in case of a single storage device disk—two disks in the row hold a parity which is useless to read. Such read speed values are roughly the same as in RAID 5. There is substantially no performance increase as to the write speed in RAID 6, because every new write requires a recalculation and update of two different parity blocks. RAID 6 is somewhat expensive storage option. However, when large and reliable storage is desired, then RAID 6 is one of the best choices due to its ability to protect data if two disk failures occur.

As mentioned above, unlike RAID 0/1, RAID 5/6 would have one or two parity arms for redundancy. The parity P arm for RAID 5/6 is an XOR of all the data arms and Q is a co-efficient calculated again from all the arms (e.g., Galois co-efficient). When an arm is not present or a part of data from any arm is not available then it can be regenerated from the remaining data and parity arms. This redundancy level for RAID 5 is 1 and for RAID 6 is 2.

Having parity exposes its own challenges since each update for the data arms also should result into an update for the parity. That means either one needs to read all the remaining drives to calculate new parity (e.g., Read peers Method) or the old data for the dirty arms and parity arm needs to be read to perform XOR to calculate the new parity (e.g., Read Modify Write). To perform the above step there is use for an optimized data structure to contain the information of all the data arms and parity arms.

Figure 3:
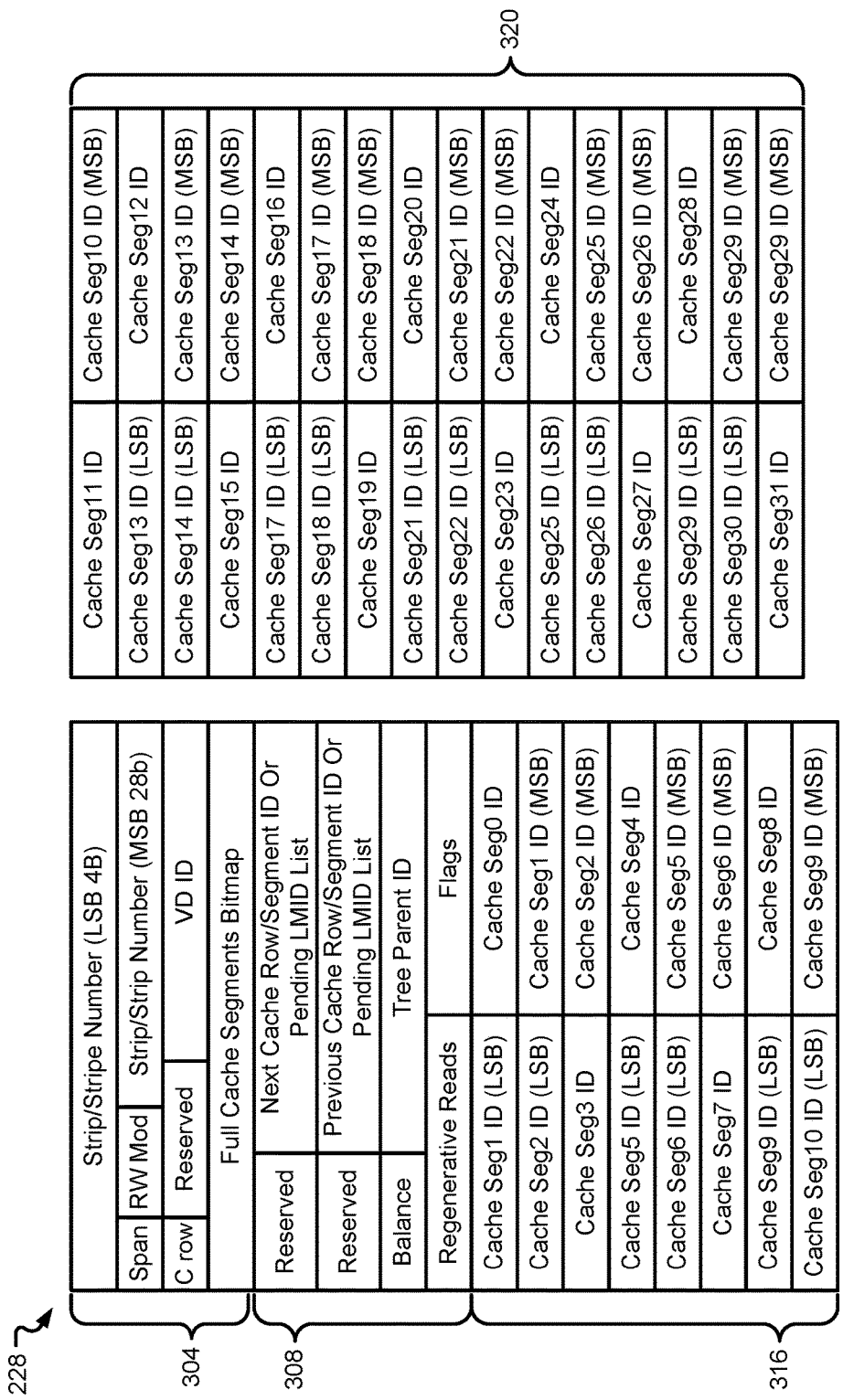
FIG. 3 is a block diagram depicting additional details of a cache frame anchor for a row in accordance with at least some embodiments of the present disclosure.

When caching is automated, it may prove useful to represent all of the parity arms in a compact form. One such example is shown in FIG. 3 and will be discussed in further detail herein. Also, when the I/O command spans only one strip, then allocating a row is avoided to limit the usage of resources which is critical in hardware based caching solutions. Furthermore, when an I/O command spans only one strip, then only a cache frame (see FIG. 4) is allocated for the strip and the cache frame ID of the strip will reside in the hash; otherwise, a row cache frame (see FIG. 3) is also allocated along with the cache frame for each strip. A row cache frame, as used herein, may contain the cache frames for all the parity arms cache segments.

For RAID 5/6, the hash key is based on the row number unlike the strip number which is used in RAID 0/1. To know if there is a cache hit, a look up is done in hash to check if there is a hash hit. The hash can contain a row cache frame anchor or a strip cache frame anchor. If a strip cache frame anchor is present, the log arm in the cache frame anchor for the strip describes to which arm this cache frame anchor belongs. If the I/O command is for the same log arm that is present in the strip cache frame anchor, then a lookup into the buffer segment section of the frame will provide the buffer segments that are dirty or valid for the strip. If a row cache frame anchor is present, then a look up into the row frame will provide the details of all the arms and their cache frames. If there is a valid strip frame present for a log Arm, a look up as in will give an indication of hit or miss.

A single unit of storage can be spread across multiple devices 136a-N and such a unit of storage may be referred to as a stripe. A stripe, as used herein and as is well known in the data storage arts, may include the related data written to multiple devices 136a-N as well as the parity information written to a parity storage device 136a-N. In a RAID-5 (also referred to as a RAID level 5) scheme, the data being stored is segmented into blocks for storage across multiple devices 136a-N with a single parity block for each stripe distributed in a particular configuration across the multiple devices 136a-N. This scheme can be compared to a RAID-6 (also referred to as a RAID level 6) scheme in which dual parity blocks are determined for a stripe and are distributed across each of the multiple devices 136a-N in the array 112.

One of the functions of the controller 108 is to make the multiple storage devices 136a-N in the array 112 appear to a host system 104 as a single high capacity disk drive. Thus, the controller 108 may be configured to automatically distribute data supplied from the host system 104 across the multiple storage devices 136a-N (potentially with parity information) without ever exposing the manner in which the data is actually distributed to the host system 104.

In the depicted embodiment, the host system 104 is shown to include a processor 116, an interface 120, and memory 124. It should be appreciated that the host system 104 may include additional components without departing from the scope of the present disclosure. The host system 104, in some embodiments, corresponds to a user computer, laptop, workstation, server, collection of servers, or the like. Thus, the host system 104 may or may not be designed to receive input directly from a human user.

The processor 116 of the host system 104 may include a microprocessor, central processing unit (CPU), collection of microprocessors, or the like. The memory 124 may be designed to store instructions that enable functionality of the host system 104 when executed by the processor 116. The memory 124 may also store data that is eventually written by the host system 104 to the storage array 112. Further still, the memory 124 may be used to store data that is retrieved from the storage array 112. Illustrative memory 124 devices may include, without limitation, volatile or non-volatile computer memory (e.g., flash memory, RAM, DRAM, ROM, EEPROM, etc.).

The interface 120 of the host system 104 enables the host system 104 to communicate with the controller 108 via a host interface 128 of the controller 108. In some embodiments, the interface 120 and host interface(s) 128 may be of a same or similar type (e.g., utilize a common protocol, a common communication medium, etc.) such that commands issued by the host system 104 are receivable at the controller 108 and data retrieved by the controller 108 is transmittable back to the host system 104. The interfaces 120, 128 may correspond to parallel or serial computer interfaces that utilize wired or wireless communication channels. The interfaces 120, 128 may include hardware that enables such wired or wireless communications. The communication protocol used between the host system 104 and the controller 108 may correspond to any type of known host/memory control protocol. Non-limiting examples of protocols that may be used between interfaces 120, 128 include SAS, SATA, SCSI, FibreChannel (FC), iSCSI, ATA over Ethernet, InfiniBand, or the like.

The controller 108 may provide the ability to represent the entire storage array 112 to the host system 104 as a single high volume data storage device. Any known mechanism can be used to accomplish this task. The controller 108 may help to manager the storage devices 136a-N (which can be hard disk drives, sold-state drives, or combinations thereof) so as to operate as a logical unit. In some embodiments, the controller 108 may be physically incorporated into the host device 104 as a Peripheral Component Interconnect (PCI) expansion (e.g., PCI express (PCI)e) card or the like. In such situations, the controller 108 may be referred to as a RAID adapter.

The storage devices 136a-N in the storage array 112 may be of similar types or may be of different types without departing from the scope of the present disclosure. The storage devices 136a-N may be co-located with one another or may be physically located in different geographical locations. The nature of the storage interface 132 may depend upon the types of storage devices 136a-N used in the storage array 112 and the desired capabilities of the array 112. The storage interface 132 may correspond to a virtual interface or an actual interface. As with the other interfaces described herein, the storage interface 132 may include serial or parallel interface technologies. Examples of the storage interface 132 include, without limitation, SAS, SATA, SCSI, FC, iSCSI, ATA over Ethernet, InfiniBand, or the like.

The controller 108 is shown to have communication capabilities with a controller cache 140. While depicted as being separate from the controller 108, it should be appreciated that the controller cache 140 may be integral to the controller 108, meaning that components of the controller 108 and the controller cache 140 may be contained within a single physical housing or computing unit (e.g., server blade). The controller cache 140 is provided to enable the controller 108 to perform caching operations. The controller 108 may employ caching operations during execution of I/O commands received from the host system 104. Depending upon the nature of the I/O command and the amount of information being processed during the command, the controller 108 may require a large number of cache memory modules 148 or a smaller number of cache memory modules 148. The memory modules 148 may correspond to flash memory, RAM, DDR memory, or some other type of computer memory that is quickly accessible and can be rewritten multiple times. The number of separate memory modules 148 in the controller cache 140 is typically larger than one, although a controller cache 140 may be configured to operate with a single memory module 148 if desired.

The cache interface 144 may correspond to any interconnect that enables the controller 108 to access the memory modules 148, temporarily store data thereon, and/or retrieve data stored thereon in connection with performing an I/O command or some other executable command. In some embodiments, the controller cache 140 may be integrated with the controller 108 and may be executed on a CPU chip or placed on a separate chip within the controller 108. In such a scenario, the interface 144 may correspond to a separate bus interconnect within the CPU or traces connecting a chip of the controller cache 140 with a chip executing the processor of the controller 108. In other embodiments, the controller cache 140 may be external to the controller 108 in which case the interface 144 may correspond to a serial or parallel data port.

Figure 2:
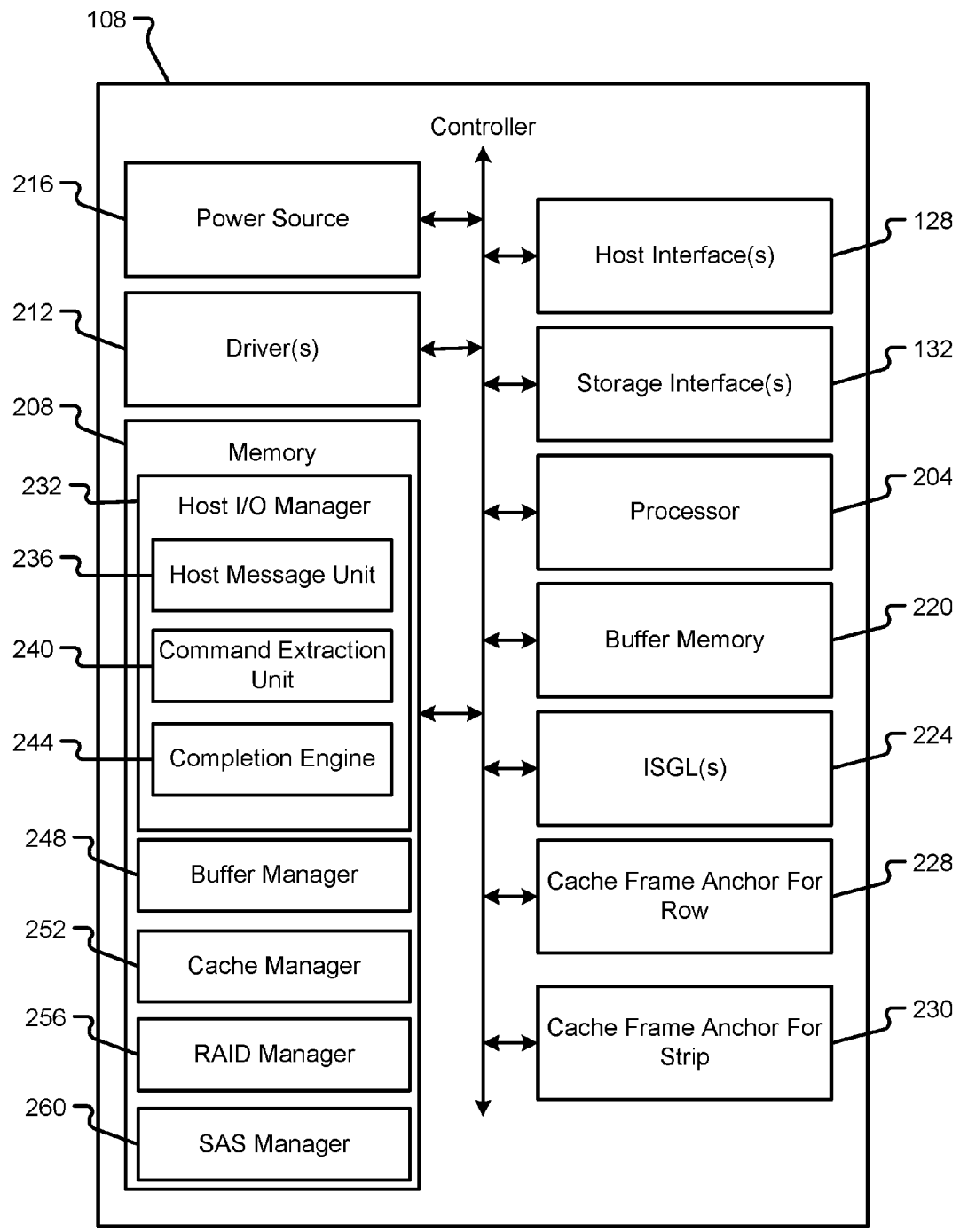
FIG. 2 is a block diagram depicting details of an illustrative controller in accordance with at least some embodiments of the present disclosure.

With reference now to FIG. 2 additional details of a controller 108 will be described in accordance with at least some embodiments of the present disclosure. The controller 108 is shown to include the host interface(s) 128 and storage interface(s) 132. The controller 108 is also shown to include a processor 204, memory 208 (e.g., a main controller memory), one or more drivers 212, and a power source 216.

The processor 204 may include an Integrated Circuit (IC) chip or multiple IC chips, a CPU, a microprocessor, or the like. The processor 204 may be configured to execute instructions in memory 208 that are shown to include a host I/O manager 232, a buffer manager 248, a cache manager 252, a RAID manager 256, and a SAS manager 260. Furthermore, in connection with performing caching or buffer functions, the processor 204 may utilize buffer memory 220, one or more ISGLs 224, a cache frame anchor for a row 228, and/or a cache frame anchor for a strip 230. The host I/O manager 232 is shown to include a plurality of sub-routines that include, without limitation, a host message unit 236, a command extraction unit 240, and a completion engine 244.

Each of the components (e.g., host I/O manager 232, buffer manager 248, cache manager 252, RAID manager 256, and SAS manager 260) may correspond to different functional blocks that operate in their own local memory loading the global memory (e.g. a global buffer memory 220 or memory 208) on an as-needed basis. Each of these different functional blocks can be accelerated by different hardware threads without departing from the scope of the present disclosure.

The memory 208 may be volatile and/or non-volatile in nature. As indicated above, the memory 208 may include any hardware component or collection of hardware components that are capable of storing instructions and communicating those instructions to the processor 204 for execution. Non-limiting examples of memory 208 include RAM, ROM, flash memory, EEPROM, variants thereof, combinations thereof, and the like. Similarly, the buffer memory 220 may be volatile or non-volatile in nature. The buffer memory may be configured for multiple read/writes and may be adapted for quick access by the processor 204.

The instructions stored in memory 208 are shown to be different instruction sets, but it should be appreciated that the instructions can be combined into a smaller number of instruction sets without departing from the scope of the present disclosure. The host I/O manager 232, when executed, enable the processor 204 to manage I/O commands received from the host system 104 and facilitate higher-level communications with the host system 104. In some embodiments, the host I/O manager 232 may utilize the host message unit 236 to process incoming messages received from the host system 104. As a non-limiting example, the controller 108 may receive messages from the host system 104 in an MPI protocol. The host message unit 236 may bring down the messages received from the host system 104 and pass the content of the messages to the command extraction unit 240. The command extraction unit 240 may be configured to determine if a particular command in a message is acceleratable (e.g., capable of being passed to a particular functional block to facilitate hardware acceleration). If a command is determined to be acceleratable, then the command extraction unit 240 may implement a hardware acceleration process and generate an appropriate Local Message ID (LMID) that represents all of the information received from the host system 104 (in the command). The LMID effectively represents the command received from the host system 104, but is in a different format that is understandable by the managers 248, 252, 256, 260. The command extraction unit 240 may, in some embodiments, route the various commands (e.g., LMIDs) to one or more of the buffer manager 248, cache manager 252, RAID manager 256, and SAS manager 260. The routing of the commands may depend upon a type of the command and the function to be executed. The completion engine of the host I/O manager 232 may be responsible for reporting to the host system 104 that an I/O command has been completed by the controller 108.

The buffer manager 248 may include instructions that, when executed, enable the processor 204 to perform various buffer functions. As an example, the buffer manager 248 may enable the processor 204 to recognize a write command and utilize the buffer memory 220 in connection with executing the write command. In some embodiments, any command or function that leverages the buffer memory 220 may utilize the buffer manager 248.

The cache manager 252 may include instructions that, when executed, enable the processor 204 to perform various caching functions. As an example, the cache manager 252 may enable the processor 204 to respond to read commands. The cache manager 252 may also enable the processor 204 to communicate with the controller cache 140 and leverage the memory modules 148 of the controller cache 140. The cache manager 252 may also manage the creation and lifecycle of cache frame anchors for rows 228, cache frame anchors for strips 230, and/or ISGLs 224. As an example, as caching functions are executed, one or more data structures 228, 230 may be created or utilized to facilitate the caching function.

The RAID manager 256 and/or SAS manager 260 may include instructions that, when executed, enable the processor 204 to communicate with the storage array 112 or storage devices 136 therein. In some embodiments, the RAID manager 256 and/or SAS manager 260 may receive commands either directly from the host I/O manager 232 (if not caching was needed) or they may receive commands from the cache manager 252 after an appropriate caching process has been performed. When invoked, the RAID manager 256 and/or SAS manager 260 may enable the processor 204 to finalize read or write commands and exchange data with the storage array 112.

The driver(s) 212 may comprise firmware, hardware, software, or combinations thereof that enable the processor 204 to make use of other hardware components in the controller 108. For instance, different drivers 212 may be provided to support functions of the interfaces 128, 132. As another example, separate drivers 212 may be provided to support functions of the buffer memory 220. The drivers 212 may perform the low-level routines that allow the processor 204 to communicate with the other hardware components and respond to commands received from the processor 204.

The power source 216 may correspond to hardware components that provide the controller 108 with the power necessary to run the processor 204 and other components. As an example, the power source 216 may correspond to a power converter that receives AC power from an external source (e.g., a power outlet) and converts the AC power into DC power that is useable by the other hardware components of the controller 108. Alternatively or additionally, the power source 216 may correspond to an internal power source (e.g., a battery pack, bank of capacitors, etc.) that provides power to the hardware components of the controller 108.

With reference now to FIG. 3, additional details of a cache frame anchor for a row 228 will be described in accordance with at least some embodiments of the present disclosure. The cache frame anchor for a row 228 is shown to include a hash section 304, a dirty list section 308, a strips section 316, and an extended strips section. The strips section 316 and extended strips section 320 may be combined into a single section without departing from the scope of the present disclosure.

The hash section 304 is shown to include a strip/stripe number identification field, a span field, a RW Mod field (e.g., a Row Modulo that is described in the beginning to avoid division), a cache row identifier field, a virtual disk (VD) identification field, and a full cache segments bitmap. The full cache segments bitmap may include a plurality of bits that describe the full/filled cache segments that are associated with or pointed to by the cache frame anchor for row 228 data structure.

The dirty list section 308 is shown to include a number of reserved fields, a next cache row/segment identifier or pending LMID list, a previous cache row/segment identifier or pending LMID list, a balance field, and a tree parent identification field. The next cache row and previous cache row fields may be used to store information related to rows that were previously allocated prior to a particular cache frame anchor for a row 228 as well as information related to rows that are slated to be allocated next. The balance field of the dirty list section 308 may be used to store information related to a balance counter that helps determine how much of the data structure 228 is remaining until it is filled. The dirty list section 308 is also shown to include a regenerative reads field and a flags field. As can be appreciated one or many flags may be stored in the flags field to indicate various types of information about the data structure 228 or components thereof. For instance, the flags field may indicate whether a cache frame anchor for a row 228 is being flushed, read, or is otherwise in use. The tree parent identification field may be used to identify a tree or parent cache segment for a particular cache frame anchor for row 228 being analyzed.

The strips section 316 and extended strips section 320 may be used to store the cache segments. In particular, the sections 316, 320 may be composed of a plurality of cache segment identification fields that use one, two, three or more bits to identify cache segments that are used for storing rows of data. The various identification fields may identify a Most Significant Bit (MSB), a Least Significant Bit (LSB), or some other identifier of a cache frame anchor. In some embodiments, each data structure 228 may be adapted to store at least 32 bits of strip identification information in section 316 and an additional 64 bits of strip identification information in section 320. As mentioned above, a cache frame anchor for row 228 may be created, modified, or otherwise employed when an I/O command spans more than a single strip.

Figure 4:
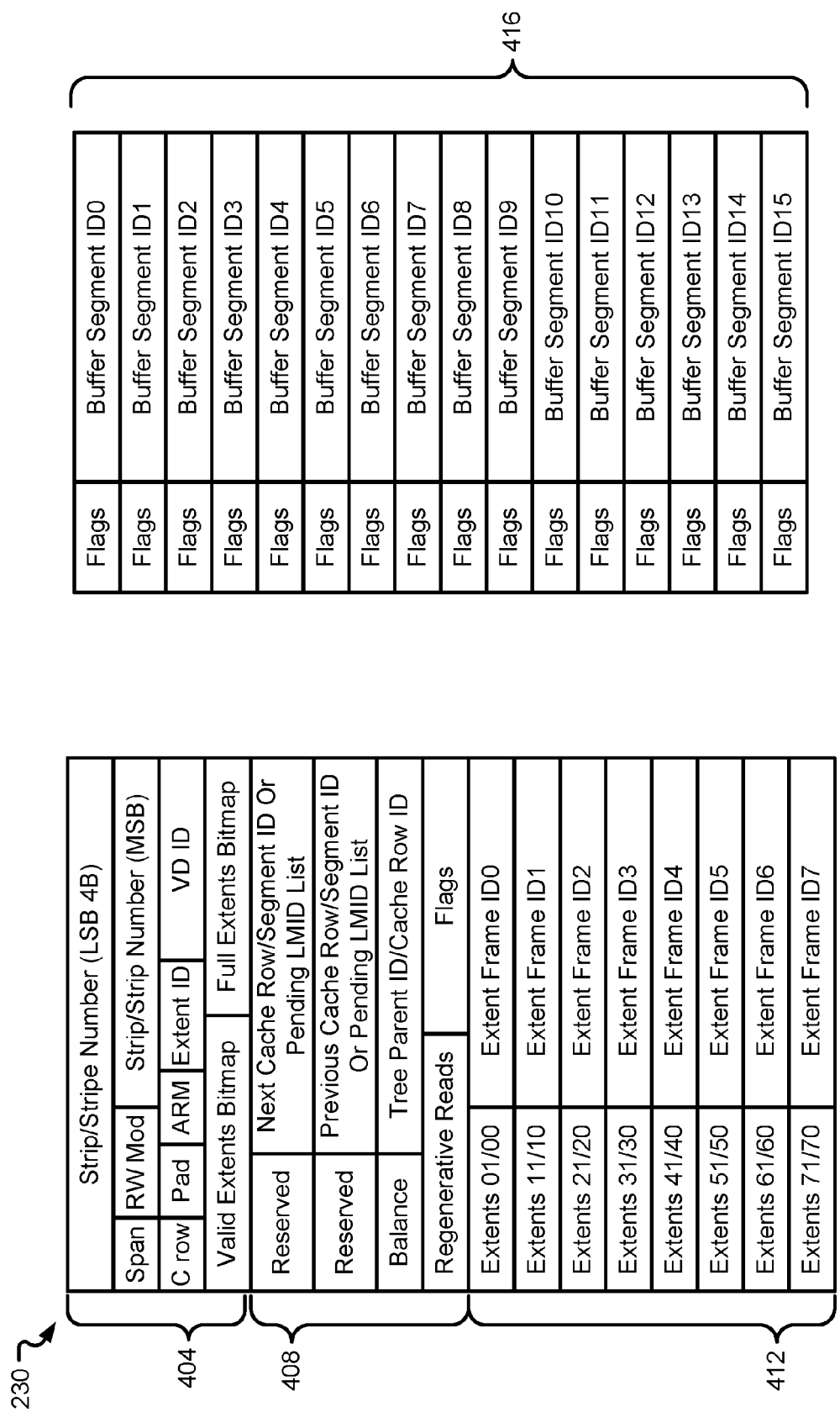
FIG. 4 is a block diagram depicting additional details of a cache frame anchor for a strip in accordance with at least some embodiments of the present disclosure.

With reference to FIG. 4, a cache frame anchor for a strip 230 is shown. The cache frame anchor for a strip 230 may be used when an I/O command does not span more than a single strip. Alternatively or additionally, a cache frame anchor for a strip 230 may be used in combination with a cache frame anchor for a row 228 when an I/O command spans more than a single strip. Although FIGS. 3 and 4 show the cache frame anchors 228, 230 to have a particular layout/organization structure, it should be appreciated that a cache frame anchor 228, 230 may have different types of configurations without departing from the scope of the present disclosure.

The cache frame anchor for a strip 230 and/or the cache frame anchor for a row 228 may correspond to a data structure that is created and managed by the cache manager 252 or other components in memory 208.

The cache frame anchor for strip 230 is shown to include a hash section 404, a dirty list section, an extents section 312, and a buffer section. The various sections of the cache frame anchor for strip 230 may be used to store data that enables the controller 208 to utilize variable stripe sizes, thereby taking advantage of different workloads (where different types of commands require different amounts of memory and processing capabilities). The same is true of the cache frame anchor for rows 228, except that the cache frame anchors for rows 228 enable the controller to utilize variable row sizes. In some embodiments, the cache manager 252 shouldn't need to worry about strip sizes, but it would be desirable to enable the cache manager 252 to effectively and efficiently respond to different types read of commands in an appropriate way.

The strip/stripe number field included in the hash section 404 may store data that identifies the strip/stripe for which the cache frame anchor for strip 230 is being used. In some embodiments, the strip/stripe field may uniquely identify a strip or stripe. In some embodiments, the strip/stripe field may identify a memory location (e.g., a starting location) of a strip or stripe of data stored in a storage device 136. For instance, the strip/stripe field may store a number that has been assigned to a particular stripe of data.

The hash section 404 is also shown to include a span field, a RowMod field, a strip/stripe field, a next cache segment ID field, a previous cache segment ID field, a cache row field, a pad field, a parity arm field, an extent identification field, a VD ID field, a valid extents bitmap, and a full extents bitmap. The strip/stripe field may contain information that is similar or identical to the strip/stripe number field. The strip/stripe field may store information about a particular strip/stripe number, information about a plurality of first strip/stripes, or information about a first strip/stripe in a group of strips/stripes. The valid extents bitmap and full extents bitmap may comprise a plurality of bits that indicate whether particular extents in the cache frame anchor for the strip 230 are valid and/or full, respectively. In some embodiments, the valid extents bitmap comprises a plurality of bits that indicate if particular extents in the cache frame anchor for the strip 230 are valid and/or able to be allocated. The full extents bitmap may comprise a plurality of bits that indicate if a particular extent in the cache frame anchor for the strip 230 are full (or not full).

The dirty list section 408 is shown to include a plurality of reserved fields, a next cache row/segment ID field, a previous row/segment ID field, a balance field, a tree parent identification field, a regenerative reads field, and a flags field. The next cache segment ID field and previous cache segment ID field may be used to track a balance of a tree/chain of extents. The cache frame anchor for strip 230 may organize data based on LBA and based on a tree structure. As buffer segments are needed to accommodate the need for more buffer memory, the cache frame anchor for strip 230 may be updated to reflect the addition of buffer segments to the tree/chain of extents. The next cache segment ID and previous cache segment ID fields may store information that links specific cache segment IDs to one another in this tree/chain structure, thereby facilitating the creation of variable stripe sizes. As the names suggest, the next cache segment ID may contain information that identifies a next cache segment in a chain of cache frame anchors (relative to a currently allocated cache frame anchor) whereas the previous cache segment ID may contain information that identifies a previous cache segment in a chain of cache segments (relative to the currently allocate cache segment). As additional cache segments or extents are added to the tree/chain, the fields may both be updated to continue tracking the progressive building of the cache segment chain.

The dirty section list 408 may contain data and/or metadata that enables the creation of a double link list. The fields in the dirty list section may be similar to fields in the dirty list section 308 of the cache frame anchor for a row 228 in that the fields containing LMID information for previous and next cache segments in a tree or chain of cache segments. These fields may be updated as additional cache segments are added to the tree or chain. The information contained in fields may include any information used to identify a cache segment that has a pending and/or active LMID. In some embodiments, the next cache segment ID field stores information related to a cache segment ID that has a pending LMID whereas the previous cache segment ID field stores information related to a cache segment ID that has an active LMID. The balance field may contain information that tracks the balance of a cache segment tree or chain. The parent/row ID field may contain information that identifies a row of data stored in the storage array 112.

The extents section 412 is shown to include a plurality of extent frames and corresponding extents. In some embodiments, the extents may store 2 nibbles of data that describe information contained within the extent section 412. As an example, the first extent frame ID0 may have its corresponding extent store nibbles of data (01/00). The second extent frame ID1 may have its corresponding extent store nibbles of data (11/10). The third extent frame ID2 may have its corresponding extent store nibbles of data (21/20). The fourth extent frame ID3 may have its corresponding extent store nibbles of data (31/30), and so on for the other extent frames. By providing the extent frames consecutively in memory, the extents in the extents section 412 can be scaled to store up to 1 MB of data in total (or more). In some embodiments, each extent can represent up to 64 kB of data. Hence, for a stripe size of 64 kB only one extent that fits in the cache frame anchor for strip 230 is needed. For a 1 MB stripe size, sixteen extents would be needed (if each extent represents 64 kB of data), which means that a total of seventeen cache frame anchors for strips 230 would be needed (including the metadata). Although eight extents are depicted, it should be appreciated that a greater or lesser number of extents can be used without departing from the scope of the present disclosure. By enabling the chaining of multiple extents, variable stripe sizes can be accommodated. In some embodiments, not all extents are allocated upon creation of the cache frame anchor for strip 230. Instead, extents can be allocated on an as-needed basis (e.g., in response to different commands). As can be appreciated, data stored in the cache frame anchor for strip 230 may be cleared when the corresponding data is committed to a storage media (e.g., a storage device 136).

The buffer segment section 416 is shown to include a plurality of buffer segments that include a buffer segment ID field and a flag field. The buffer segment ID field may be used to store identification information for buffer segments that have been used in buffer memory 220. A buffer segment section 416 may be configured to store up to twice as much data as the extents section 412. The flag field in the buffer segment section 416 may be configured to store flag information that indicates one or more of: whether a corresponding buffer segment is valid; whether a corresponding buffer segment is dirty; whether a corresponding buffer segment is flushing; whether a corresponding buffer segment has been trimmed; and/or a use count for a corresponding buffer segment.

Figure 5:
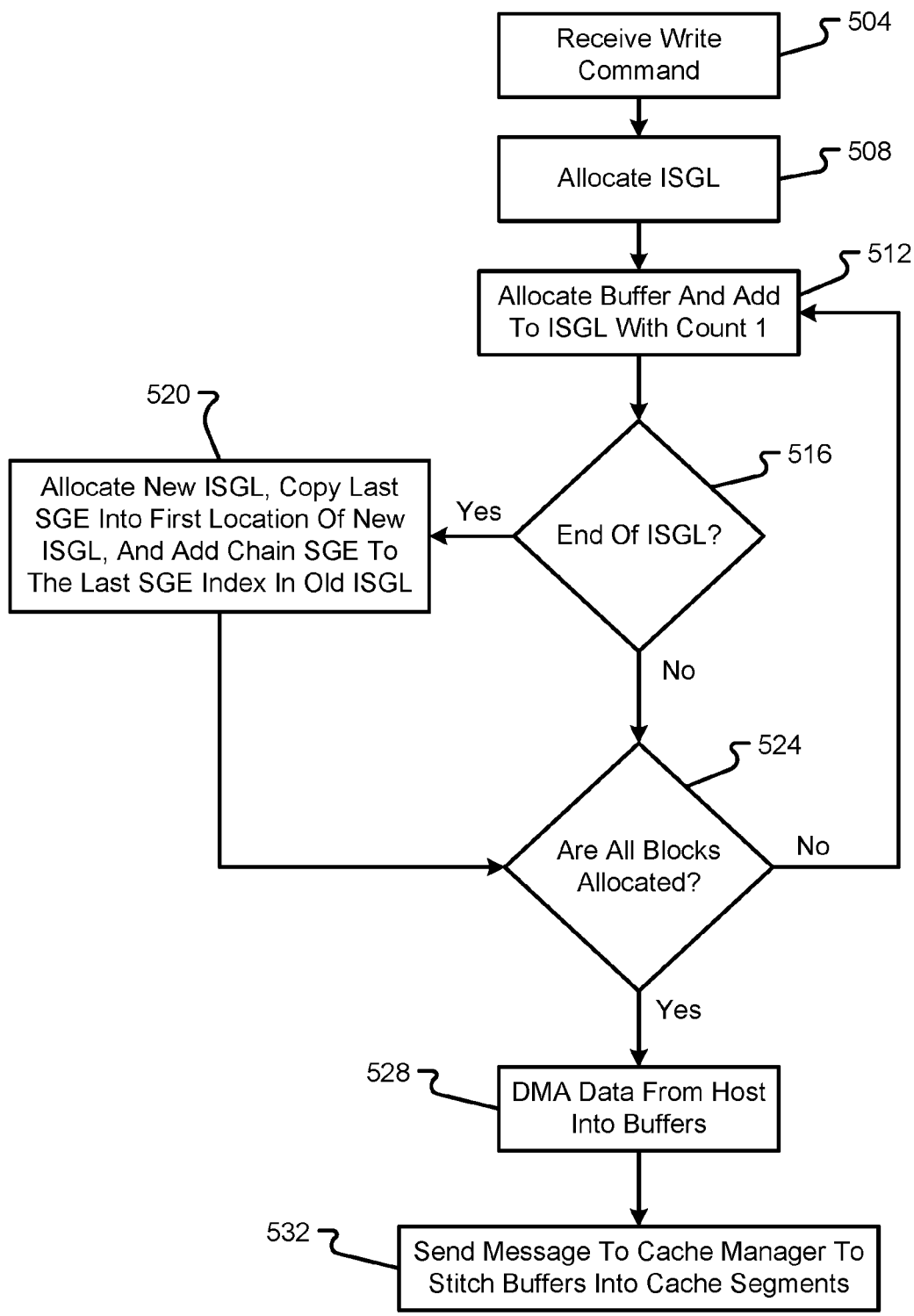
FIG. 5 is a flow diagram depicting a method of allocating write buffers in accordance with at least some embodiments of the present disclosure.

With reference now to FIG. 5, a method of allocating write buffers will be described in accordance with at least some embodiments of the present disclosure. The method begins when a write command is received at the host I/O manager 232 (step 504). The host I/O manager 232 may then provide an LMID (one or many) to the buffer manager 248 to further execute the write command. In some embodiments, the buffer manager 248 allocates the buffer segments from the buffer memory 220. The amount of data being written may dictate how many buffer segments are allocated by the buffer manager 248.

In some embodiments, the buffer manager 248 allocates buffer segments of 4 kB size and the buffer segment IDs are populated into the ISGLs to represent the complete I/O command. To accommodate this task, the buffer manager 248 may first allocate an ISGL (step 508). The buffer manager 248 may then allocate a buffer segment and add the ID of the allocated buffer segment to the allocated ISGL with a count of '1' (step 512). The buffer manager 248 then determines if it is reached the end of the ISGL (e.g., filled the first allocated ISGL) (step 516). If so, then the buffer manager 248 will allocate a new ISGL, copy the last Scatter Gather Extent (SGE) into the first location of the new ISGL, and add a chain of SGEs to the last SGE index in the previously-allocated (and now full) ISGL (step 520). Thereafter, or if the buffer manager 248 has not reached the end of the ISGL (as determined in step 516), the buffer manager 248 will continue by determining whether enough buffer segments have been allocated to support the write command (step 524). If this query is answered negatively, then the buffer manager 248 returns to step 512. If the query of step 524 is answered positively, then the buffer manager 248 sends the ISGL and the host SGL to copy the data from the host I/O manager 232 into the new buffer segments that have been allocated (step 528). In other words, the buffer manager 248 informs the host I/O manager 232 that the data can be committed from the host 104 into the buffer memory 220. Appropriate messaging is then sent from the buffer manager 248 to the cache manager 252 to stitch the buffer segments into cache segments, thereby enabling the allocated write buffers to receive the data from the host 104.

Figure 6A:
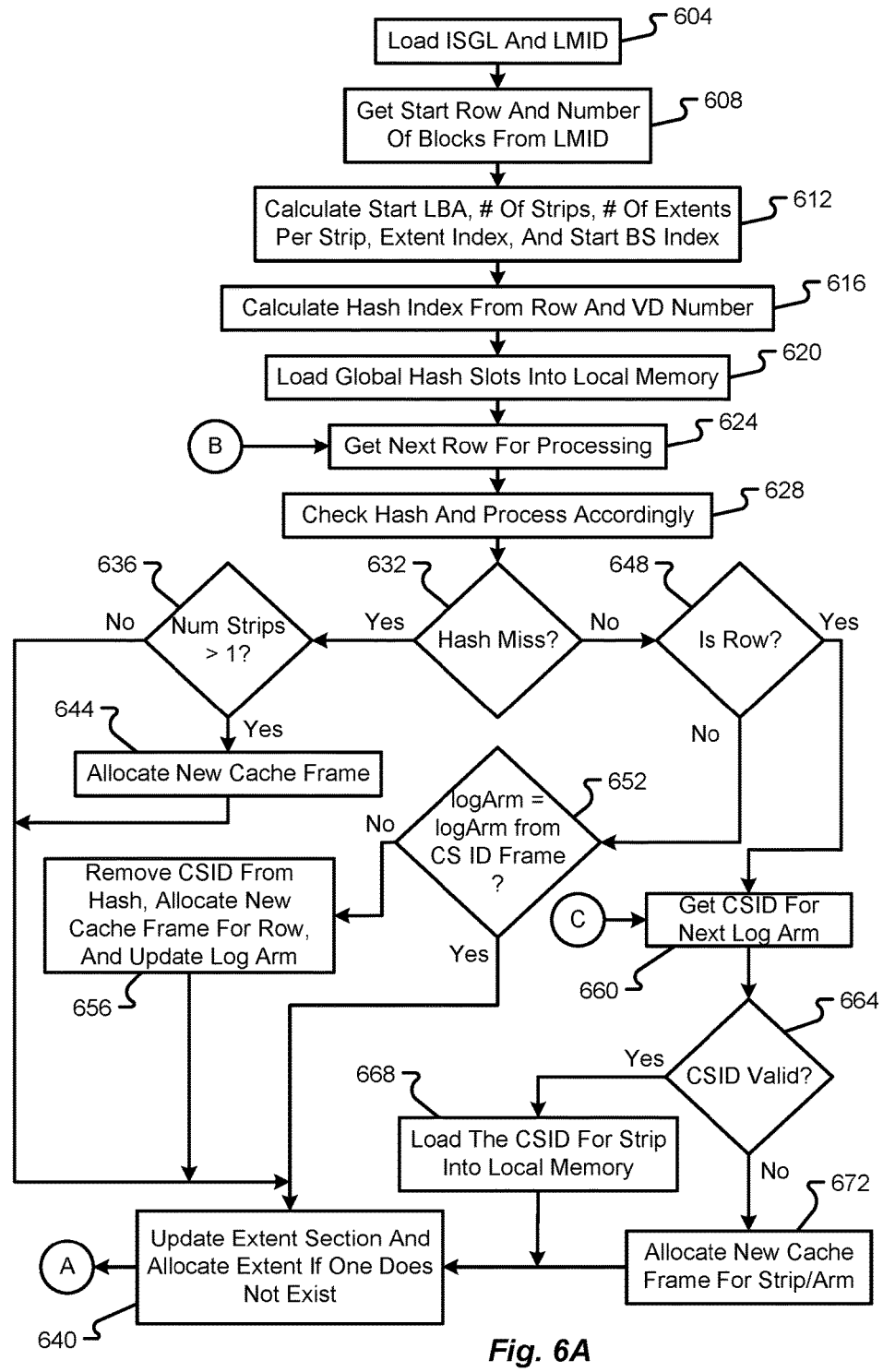
FIG. 6A is a first portion of a flow diagram depicting a method of cache buffering in accordance with at least some embodiments of the present disclosure.
Figure 6B:
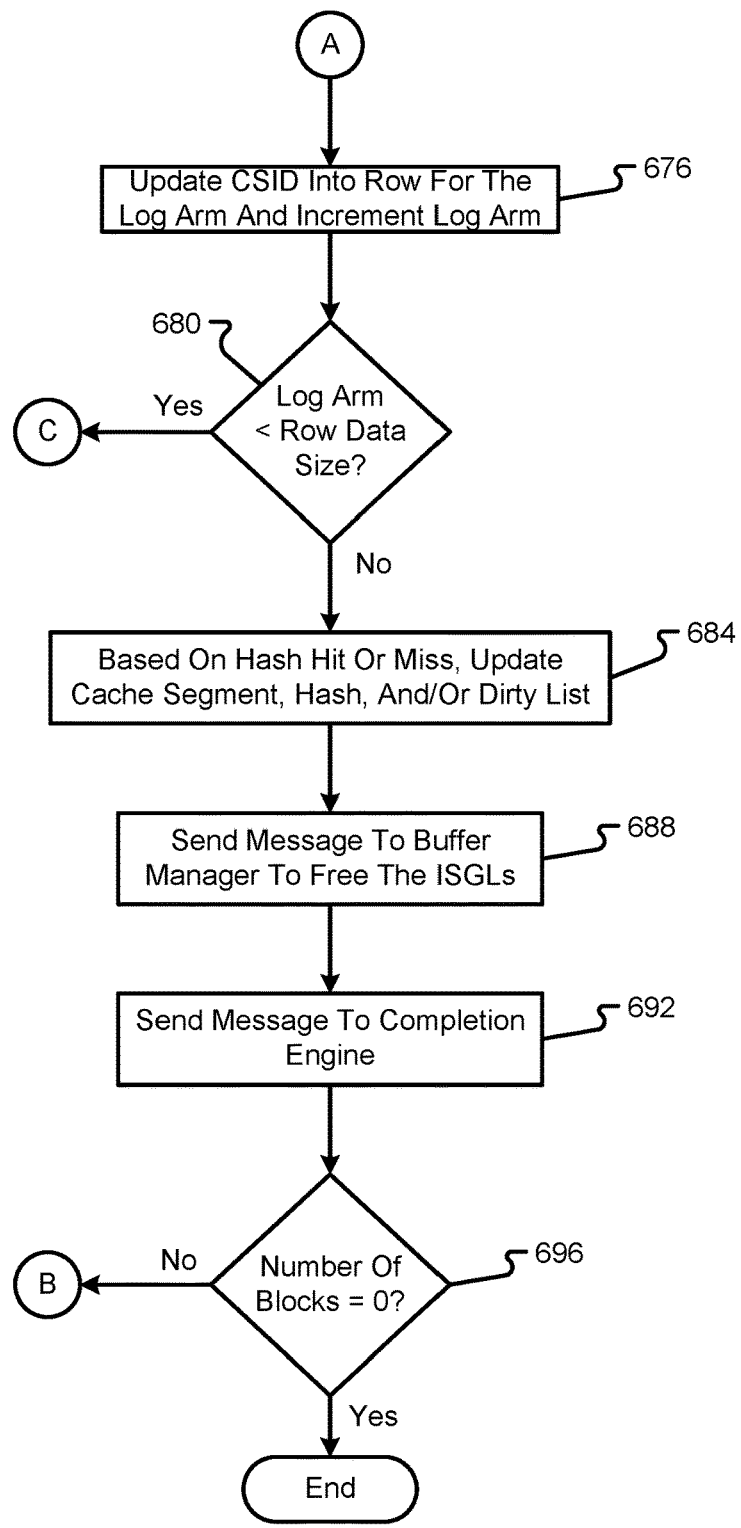
FIG. 6B is a second portion of the flow diagram of FIG. 6A.

With reference now to FIG. 6, a method of cache buffering will now be described in accordance with at least some embodiments of the present disclosure. The method begins when an LMID is received at the cache manager 252 (step 604). The LMID may be received from the host I/O manager 232 or the buffer manager 248 or any other module-like firmware. This step may also include loading the ISGL that was received along with the LMID. The method continues by loading the LMID into local memory used by the cache manager 252 and then obtaining the start row and the number of blocks from the LMID (step 608). This information is used to calculate the start LBA, the number of strips from the start strip that are spanned by the I/O command, the number of extents per strip, an extent index, and the start buffer segment index (step 612). This step may also include obtaining a parity arm (e.g., a Log Arm) and an offset in the parity arm from the LMID. In some embodiments, the start strip and the number of block are obtained directly from the LMID. The start LBA is calculated from the start row, the start logical arm, and the offset in the start logical arm. The number of rows needed from the start strip is calculated form the number of blocks needed to accommodate the I/O command. The number of extents per strip is calculated by dividing the strip size by the number of buffer segments in an extent. The extent index is calculated by dividing the offset in the first arm by the number of buffer segments in an extent. It should be appreciated that all of the divisions described above can be achieved with shift operations.

The cache manager 252 proceeds by a hash index from the strip and virtual disk (VD) number (step 616). The cache manager 252 thereafter loads the global hash slots into its local memory (step 620). The cache manager 252 then gets the next row for processing (step 624) and begins checking if the calculated hash is presented in the global hash slots that are loaded into memory (steps 628 and 632). In other words, the cache manager 252 checks to see if there is a hash hit or not. If a hash hit is present (e.g., the calculated hash is found in the existing hash slots), then the cache manager 252 will proceed by determining if the hash hit corresponds to a row hit (step 648). If the hash hit corresponds to a row hit, then the cache manager 252 will get the cache segment ID for the Log Arm (step 660). Thereafter, the cache manager 252 will determine if the cache segment ID is a valid ID (step 664). If the cache segment ID is valid, then the cache manager 252 loads the cache segment ID for the strip into local memory (step 668) and then updates the extent section of the cache frame anchor for the strip 230 if one does not yet exist (step 640). If the cache segment ID is not valid, then the cache manager 252 will allocate a new cache frame for the strip (step 672). Thereafter, the method proceeds to step 640.

Referring back to step 648, if the cache manager 252 determines that the hash hit does not correspond to a row, then the cache manager 252 will determine if the Log Arm (e.g., the parity data) is equal to the Log Arm for the current cache segment ID frame (step 652). If this query is answered positively, then the method proceeds to step 640. Otherwise, the cache manager 252 will remove the cache segment ID from the hash, allocate a new cache frame for the row 228, And update the Cache Segment ID of the Log Arm into the row CS 228. Once this is completed, the method proceeds to step 640.

Referring back to step 632, if the cache manager 252 determines that a hash miss has occurred, then the cache manager 252 proceeds to 632 (inserted newly in the figure: Allocate a new Cs for strip) to allocate a new Cache frame anchor for the Log Arm. Then Cache Manager 252 will determine if the number of strips spanned by the current I/O command is greater than one (step 636). If this query is answered negatively, then the method proceeds to step 640. On the other hand, if the I/O command spans more than a one strip, then the cache manager 252 will allocate a new cache frame for the row 228 and update the Cache frame anchor ID into the Row 228

After step 640, the method proceeds with the cache manager 252 updating the cache segment ID into the row for the Log Arm and incrementing the Log Arm (step 676). The cache manager 252 then determines if the Log Arm is less than number of data arms (step 680). If yes, then the method returns to step 660. If no (e.g., the Log Arm that is greater or equal to the number of data arms meaning that all the arms in the row are processed), then the method proceeds with the cache manager 252 updating the cache frame anchor for row 228, cache frame anchor for strip 230, updating appropriate hash sections 304, 404, and/or updating dirty list sections 308, 408 based on whether a hash hit or miss occurred (step 684). In some embodiments, if there was a hash miss (e.g., no hash hit), then the hash section is updated with the new cache segment ID allocated (Please update accordingly: either for the row if row was allocated or for the strip if only strip CS was allocated) and it is added to the dirty Most Recently Used (MRU) list. Conversely, if there was a hash hit, then the cache segment is removed from the dirty list and is added to the MRU list.

The method continues by sending a message to the buffer manager 248 to free the ISGLs (step 688). This message may be sent by the cache manager 252 in the form of an LMID. Then the cache manager 252 or buffer manager 248 may send a message to the completion engine 244 indicating that the I/O command has been completed and the data therefrom has been updated to Cache the storage array 112 (step 692). The cache manager 252 finally determines if any additional blocks in the I/O command need processing (step 696). If additional blocks remain (e.g., the current number of blocks is not equal to zero), then the method returns to step 624. Otherwise, the method ends. (Step 688, 692 should come after the step 696). Ie. ISGL is freed and command is completed after the number of blocks become 0. Please update the figure also accordingly.

Figure 7A:
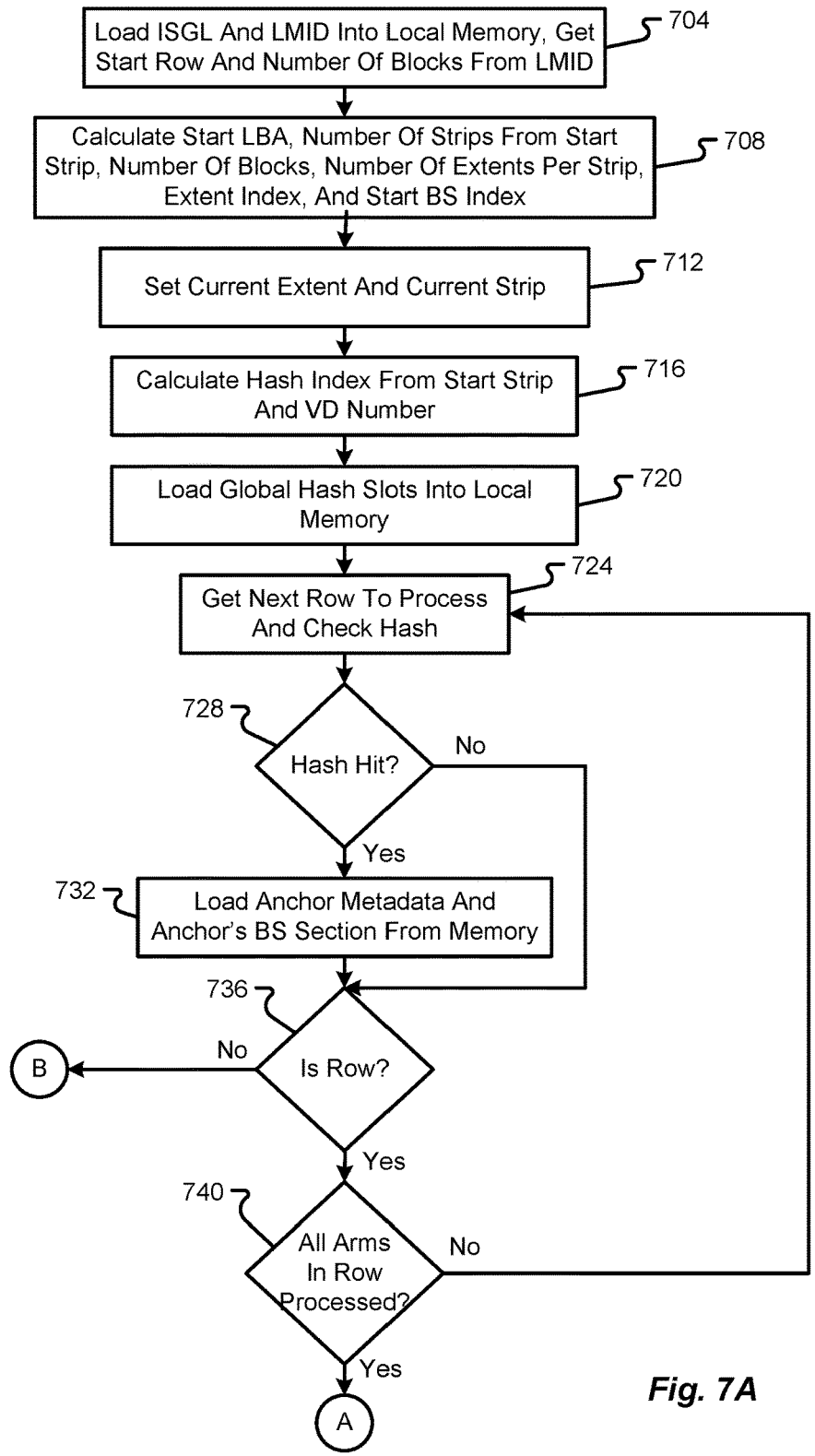
FIG. 7A is a first portion of a flow diagram depicting a method of performing a cache scan in accordance with at least some embodiments of the present disclosure.
Figure 7B:
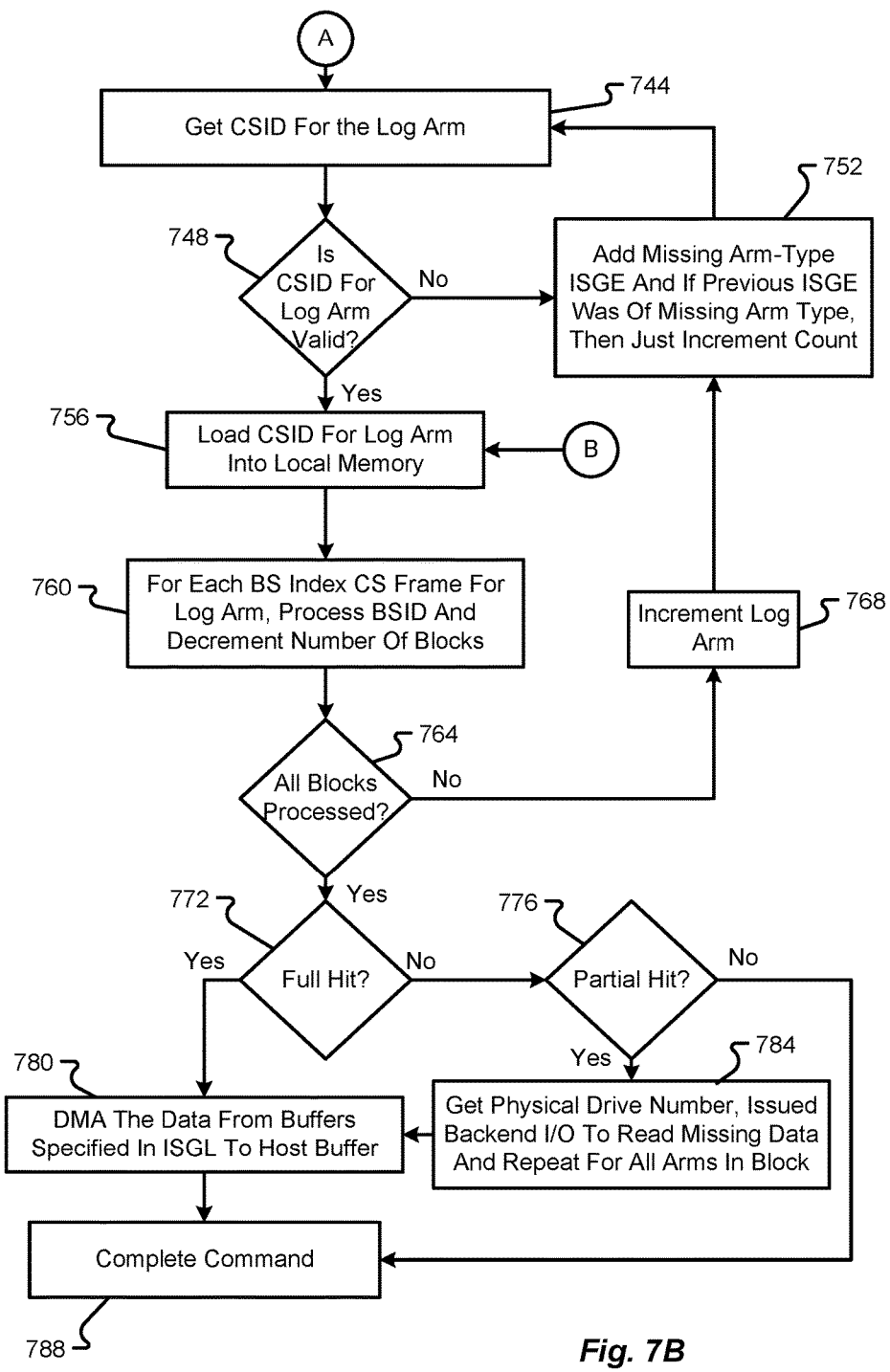
FIG. 7B is a second portion of the flow diagram from FIG. 7A.

With reference now to FIGS. 7A and 7B, a method of performing a cache scan will be described in accordance with at least some embodiments of the present disclosure. The method begins with the cache manager 252 loading an LMID into local memory and obtaining a start row and number of blocks for the command from the LMID (step 704). The cache manager 252 then calculates the start LBA (from the start row), the number of strips from the start strip, the number of extents per strip, an extent index, and a start buffer segment index (step 708). The start extent may be calculated by dividing the start reference by the number of blocks per cache segment extent.

The cache manager 252 continues by setting a current extent and a current strip (step 712). In the beginning, the current extent is equal to the start extent and the current strip is equal to the start strip. The cache manager 252 then calculates a hash index from the start strip and from the VD number (step 716). In some embodiments, the calculated hash along with other global hash slots are loaded into local memory (step 720). The cache manager 252 then obtains the next row and checks to see if the Cache Segment ID is found for the current row in the hash slots (step 724). If a hash hit is detected (step 728), then the cache manager 252 will load the cache frame into local memory. In some embodiments, the cache manager 252 may be able to load the entire 128 bytes so that while processing the buffer/extent section, there is no need for additional loading (step 732).

In some embodiments, an anchor is typically used to refer to the metadata for a strip cache segment. But if the cache segment is for a row, then it is not referred to as an anchor. This check is made at step 736. If the cache segment is not for a row, then the method proceeds to step 756. Otherwise, the method proceeds with the cache manager 353 determining if all arms in the row have been processed (step 740). If the query of step 740 is answered negatively, then the method returns back to step 724. Otherwise, the method proceeds with the cache manager 252 obtaining the cache segment ID, which is available in the hash. After loading the cache manager 252 checks if the cache segment ID is for a row or a strip. If it is for strip then it means that there is only one strip worth of data available in the cache. Otherwise, the row cache segment will provide the information on how many strips of cache data are available in cache.

In other words, if the CSID that is loaded indicates that it is for a strip and not for a row, then step 756 will populate the ISGL, with Buffer segment IDs if a buffer exists in the extent section, skip type ISGE if the buffer segment ID in extent section is invalid, if contiguous buffer segments are not available then a cumulative skip count is added.

On the other hand, if the CSID indicates that it is for a row, then the cache manager 252 notes down the current LogArm needed to start working on. From the current LogArm until all arms are processed in the current row. The above is repeated (e.g., populating ISGLs) for each of the ARM (steps 760, 764, and 768).

If all blocks have been processed, the method continues with the cache manager 252 determining if a full hit has occurred (step 772). If a full hit has occurred (e.g., hash values match completely), then the data from the buffers specified in the ISGL is transferred to the host buffers specified in the IO command (LMID) using Direct MemoryAccess (DMA) to the host buffer. Thereafter, the completion engine 244 is notified of the I/O completion (step 788).

Referring back to step 772, if there is not a full hit, then the cache manager 252 determines if there is a partial hit (step 776). A partial hit may occur when there exists either a Cache Segment for the row/strip in the hash, but some or more blocks do not have the buffers in the extent section of the Cache segments for strips. Sometimes even though hash indicates that there is a Cache segment present but none of the blocks that are required for the current IO are present in the extent sections, so in that case it is still a complete miss. If there is no partial hit (e.g., a complete miss), then again it has to go to 784 since all the data needs to be read from the drives. If there is a partial hit, then the Raid manager 252 will get the physical drive number for the Log Arm/parity data, issue a backend I/O command to read the missing data from the storage devices 136/disk drives, and the repeat for all arms data until all of the blocks are processed (step 784). Thereafter, the method proceeds to step 780 (e.g., first the data is transferred from the drives to the host and then the cache data is next transferred back to the host). So effectively any stale data read from the drives into host data is over written by the cache data making sure that host gets the correct data.

Figure 8:
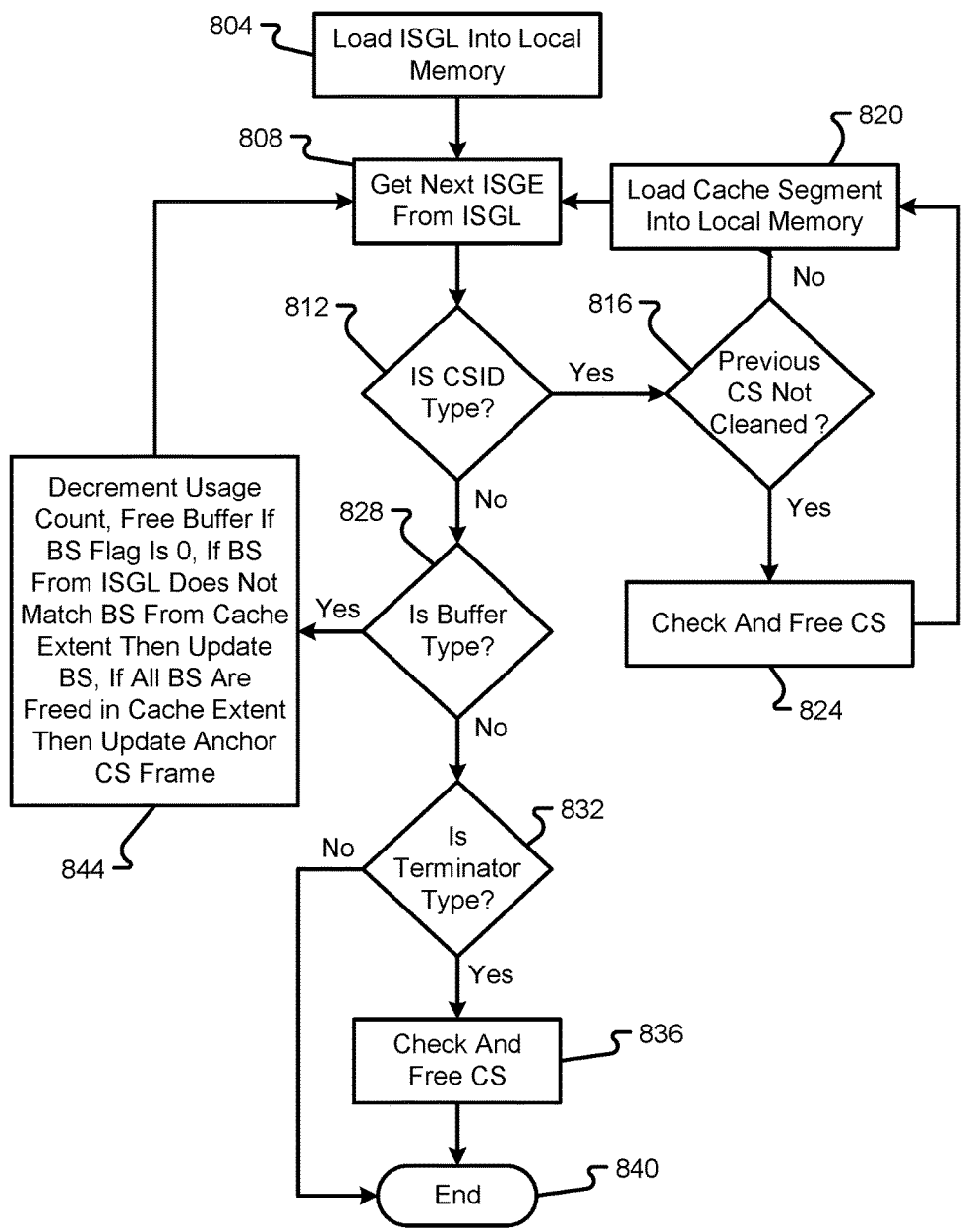
FIG. 8 is a flow diagram depicting a method of performing a cache update in accordance with at least some embodiments of the present disclosure.

With reference now to FIG. 8, a method of performing a cache update after a read will be described in accordance with at least some embodiments of the present disclosure. The method begins with the cache manager 252 loading an ISGL into local memory for processing by the cache manager 252 (step 804). The method proceeds with the cache manager 252 obtaining the next ISGE from the ISGL (step 808). The cache manager 252 then determines if the next ISGE is of a cache segment ID type (step 812). If this query is answered affirmatively, then the cache manager 252 determines whether or not the previous cache segment has been cleaned up (step 816). If the previous cache segment is not cleaned, then the cache manager 252 checks to see if it can be freed. It can be freed if all the extents in it are also freed (see e.g., FIG. 9). If it can be freed it frees the cache segment (step 824). Thereafter, or in the event that the previous cache segment was already cleaned up, the cache manager will load the cache segment into local memory (step 820). The method then returns to step 808.

Referring back to step 812, if the next ISGE is not of a cache segment ID type, then the cache manager 252 determines whether the next ISGE is of a buffer type (step 828). If the ISGE is not of a buffer type, then the method proceeds by determining if the next ISGE is of a terminator type (step 832). If this query is answered negatively, So the only ISGE type left is Skip type, so we ignore it and go to step 808 to process the next ISGE. If the next ISGE is of a terminator type, then the cache manager checks and frees the cache segment (step 836) prior to the process ending at step 840. Steps in FIG. 9 have to be followed to free the Cache segment, there could be cases where we cannot free it.

Referring back to step 828, if the next ISGE is determined to be of a buffer type, the method proceeds with the cache manager 252 decrementing the usage count, freeing the buffer if the buffer segment flag is set to zero and then performing additional processing based on whether or not the buffer segment from the cache extent matches the buffer segment from the ISGL (step 844). During this processing, if the buffer segment from the ISGL does not match the buffer segment from the extent, then the cache manager 252 updates the buffer segment and flags in a global table. In some embodiments, this global table will have just flags field. This table can be indexed by Buffer Segment ID, for example. On the other hand, if all of the buffer segments are freed in the extent, then the entire extent is freed and the cache frame anchor for the strip 230 or row 228 is updated. The method then proceeds back to step 808.

Figure 9:
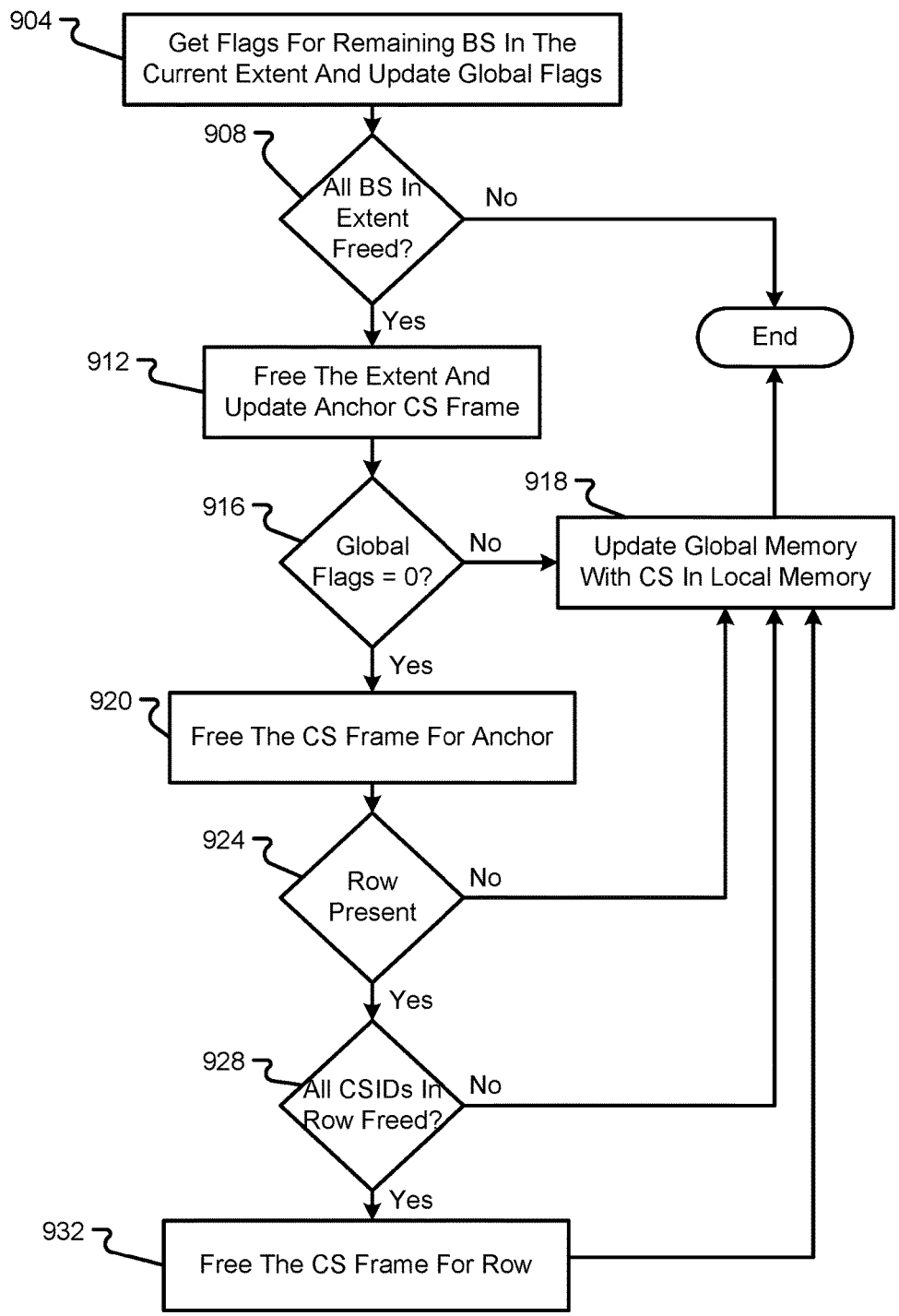
FIG. 9 is a flow diagram depicting a method of checking and freeing a cache segment in accordance with at least some embodiments of the present disclosure.

With reference now to FIG. 9, a method of checking and freeing a cache segment will be described in accordance with at least some embodiments of the present disclosure. The method begins with the cache manager 252 getting the flags for the remaining buffer segments in a current extent and updating global flags as appropriate (step 904). The cache manager 252 then determines if all buffer segments in an extent have been freed (step 908). If this query is answered negatively, then the method ends. However, if the query is answered affirmatively, then the method proceeds with the cache manager 252 freeing the current extent and updating the cache frame anchor for strip 230 to reflect the same (step 912).

The cache manager 252 then determines if the global flags have a value of zero (step 916). If the cache segment cannot be freed, the cache segment in the local copy is updated to the global memory (step 918). If so, then the method continues with the cache manager 252 freeing the cache frame anchor for the anchor 228 (step 920). The cache manager 252 then determines if there is a row present (step 924). If this query is answered negatively, then the process proceeds to step 918. If the query is answered affirmatively, then the method proceeds with the cache manager 252 determining if all of the cache segment ID in the row have been freed (step 928). If the cache segment cannot be freed for the row, the cache segment in the local copy is updated to the global memory (step 918). If, however all of the cache segment IDs in the row have been freed, then the entirety of the cache segment and the row are freed (step 932). When the row is freed, the CSID of the row also is removed from the hash and dirty lists if they are present. If row CSID does not exist (e.g., the strip cache segment is the only one present for this row), then this CSID is removed from the hash and dirty lists if they are present.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A caching method, comprising:
   receiving a host command from a host;

extracting command information from the host command;
determining an Input/Output (I/O) action to be taken in connection with the host command;
determining that the I/O action spans more than one strip; and
based on the I/O action spanning more than one strip, allocating a cache frame anchor for a row on-demand along with a cache frame anchor for a strip to accommodate the I/O action, wherein the cache frame anchor for the row differs from the cache frame anchor for the strip in that the cache frame anchor for the row enables a controller to utilize variable row sizes whereas the cache frame anchor for the strip enables the controller to utilize variable stripe sizes.

2. The caching method of claim 1, wherein the host command comprises a write command.

3. The caching method of claim 1, wherein the I/O action include storing data and one or more parity arms in a storage array, wherein the one or more parity arms each correspond to an XOR of data arms stored in the storage array.

4. The caching method of claim 3, further comprising:
receiving a second host command from the host;
extracting second command information from the second host command;
determining a second I/O action to be taken in connection with the second host command;
determining that the second I/O action does not span more than one strip; and
based on the second I/O action not spanning more than one strip, allocating only a second cache frame anchor for a row to accommodate the second I/O action.

5. The caching method of claim 1, wherein the cache frame anchor for the strip comprises an extents section.

6. The caching method of claim 5, wherein the extents section refers to a plurality of buffer segments that are aligned and contiguous in memory.

7. The caching method of claim 1, wherein the cache frame anchor for the row comprises a plurality cache segment identifiers belonging to a strips section.

8. The caching method of claim 1, wherein the cache frame anchor for the row comprises a full cache segments bitmap that includes a plurality of bits that identify whether particular cache segments belonging to the cache frame anchor for the row are full or not.

9. A memory control system, comprising:
a processor; and
a computer-readable medium coupled to the processor, the computer-readable medium comprising processor-executable instructions that include:
instructions to receive a host command from a host;
instructions to extract command information from the host command;
instructions to determine an Input/Output (I/O) action to be taken in connection with the host command;
instructions to determine that the I/O action spans more than one strip; and
instructions to, based on the I/O action spanning more than one strip, allocate a cache frame anchor for a row on-demand along with a cache frame anchor for a strip to accommodate the I/O action, wherein the cache frame anchor for the row enables the processor to utilize variable row sizes whereas the cache frame anchor for the strip enables the processor to utilize variable stripe sizes.

10. The memory control system of claim 9, wherein the host command comprises a write command.

11. The memory control system of claim 9, wherein the I/O action include storing data and one or more parity arms in a storage array, wherein the one or more parity arms each correspond to an XOR of data arms stored in the storage array.

12. The memory control system of claim 11, further comprising:
instructions to receive a second host command from the host;
instructions to extract second command information from the second host command;
instructions to determine a second I/O action to be taken in connection with the second host command;
instructions to determine that the second I/O action does not span more than one strip; and
instructions to, based on the second I/O action not spanning more than one strip, allocate only a second cache frame anchor for a row to accommodate the second I/O action.

13. The memory control system of claim 9, wherein the cache frame anchor for the strip comprises an extents section.

14. The memory control system of claim 13, wherein the extents section refers to a plurality of buffer segments that are aligned and contiguous in memory.

15. The memory control system of claim 9, wherein the cache frame anchor for the row comprises a plurality cache segment identifiers belonging to a strips section.

16. A computing system, comprising:
a plurality of memory modules, each being configured to execute different Input/Output (I/O) actions; and
a controller that receives a host command from a host, extracts command information from the host command, determines an Input/Output (I/O) action to be taken in connection with the host command, determines that the I/O action spans more than one strip, and based on the I/O action spanning more than one strip, allocate a cache frame anchor for a row on-demand along with a cache frame anchor for a strip to accommodate the I/O action, wherein the cache frame anchor for the row enables the controller to utilize variable row sizes whereas the cache frame anchor for the strip enables the controller to utilize variable stripe sizes.

17. The computing system of claim 16, wherein the host command comprises a write command.

18. The computing system of claim 17, wherein the I/O action include storing data and one or more parity arms in a storage array, wherein the one or more parity arms each correspond to an XOR of data arms stored in the storage array.

19. The computing system of claim 16, wherein the cache frame anchor for the strip comprises an extents section.

20. The computing system of claim 19, wherein the extents section refers to a plurality of buffer segments that are aligned and contiguous in memory.

* * * * *